United States Patent [19]
Ririe

[11] Patent Number: 5,092,311
[45] Date of Patent: Mar. 3, 1992

[54] COOKING POT SUPPORT MECHANISM

[76] Inventor: RObert L. Ririe, 105 S. Mallard, Las Vegas, Nev. 89107

[21] Appl. No.: 680,848

[22] Filed: Apr. 5, 1991

[51] Int. Cl.$^5$ ............................................. A47J 37/00
[52] U.S. Cl. ................................ 126/25 R; 126/9 R; 211/181
[58] Field of Search .............. 126/25 R, 9 R, 29, 9 A, 126/30, 9 B, 41 R, 50 15 R, 348, 25 A; 99/410, 449, 411, 413, 414; 211/181

[56] References Cited
U.S. PATENT DOCUMENTS

| | | | |
|---|---|---|---|
| 242,158 | 5/1881 | Rockey | 126/25 R |
| 243,315 | 6/1881 | Seyler | 126/25 R |
| 2,221,098 | 11/1940 | Langsam | 126/25 R |
| 2,820,446 | 1/1958 | Freeman | 126/25 R |
| 4,690,125 | 9/1987 | Beller . | |
| 4,773,319 | 9/1988 | Holland . | |

*Primary Examiner*—James C. Yeung

[57] ABSTRACT

A mechanism for supporting a covered cooking pot within the firebox of a barbecue grille so that the side wall of the pot acts as a heating surface rather than a heat-dissipating surface. The support mechanism includes a ledge structure positionable on the rim of the firebox, a pot-support platform depressed below the level of the ledge structure, and a series of struts extending downwardly from the ledge structure to the platform.

2 Claims, 1 Drawing Sheet

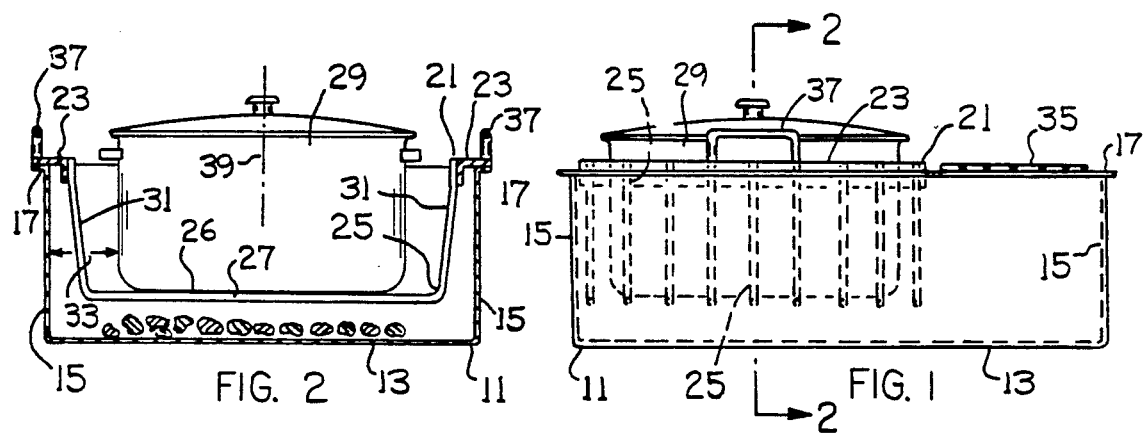
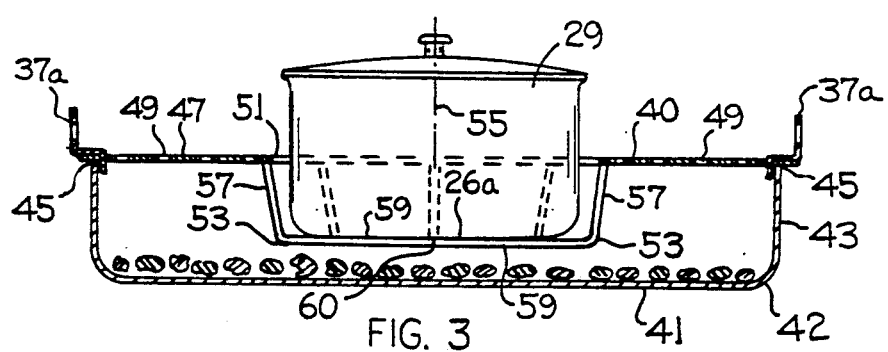

COOKING POT SUPPORT MECHANISM

BACKGROUND AND SUMMARY OF THE INVENTION

This invention relates to a support mechanism for covered cooking pots commonly known as Dutch ovens. Such cooking pots are cast iron pots used for baking, roasting or boiling different food items, e.g. pot roasts, stews, soups, potatoes, etc.

It has not heretofore been practical to use dutch ovens on conventional charcoal grilles because the side surfaces of the cooking pots tended to dissipate heat out of the pots. Heat directed into the pot through its bottom wall tended to immediately escape through the pot side walls without significantly heating the food item within the pot. In this connection, it is noted that the surface area of the side wall of a conventional cooking pot is two or three times the area of the pot bottom wall. Also, the lid of the pot acts as a heat dissipating device. Thus, the total surface area for dissipating heat out of the covered cooking pot is appreciably greater than the surface area used to input heat into the pot; because of this fact it is difficult to raise the interior temperature within the pot into a practical cooking temperature range. Another negative factor is that the food supporting racks in conventional charcoal grilles or gas-fired grilles are elevated above the heat source as much as six inches. When the covered cooking pot is placed on the conventional food-support rack its bottom surface is relatively remote from the heat source; the heat tends to dissipate before reaching the pot bottom wall. The present invention relates to a cooking pot support mechanism for use on conventional barbecue grilles. The grille can utilize charcoal as a heat source or combustible fuel gas as a heat source. The invention relates to the pot support mechanism, not the grille construction.

The support mechanism of this invention comprises a horizontal ledge means locatable on the peripheral rim of a firebox, a pot-support platform depressed below the ledge means, and a series of generally vertical suspension struts interconnecting the ledge means and the platform. When the support mechanism is positioned on the firebox of a barbecue grille the depressed platform will be located within the box in relatively close proximity to the box bottom wall. Heat generated at the box bottom wall is enabled to enter into the cooking pot through the pot-bottom wall and also through the pot side wall. The pot side wall is no longer a heat dissipating surface; instead it becomes a heat input surface. The pot heating action is thus greatly improved. The heating action is also improved because the pot bottom wall is now relatively close to the heat source.

THE DRAWINGS

FIG. 1 is a front elevational view of a conventional barbecue grill having a pot support mechanism of the present invention installed thereon.

FIG. 2 is a sectional view on line 2—2 in FIG. 1.

FIG. 3 is a sectional view taken through another grille equipped with a pot support mechanism embodying the intention.

DESCRIPTION OF PREFERRED EMBODIMENTS OF THE INVENTION

FIGS. 1 and 2 fragmentarily illustrate a conventional charcoal grille that includes a rectangular sheet metal firebox 11 having a bottom wall 13, and four upstanding side walls 15; the upper edges of the side walls form a peripheral rim 17. In use of the grille, charcoal is poured into the firebox and ignited to form a heat source. Normally a food-support rack (not shown) is placed on peripheral rim 17 to support food items (e.g. hot dogs or hamburgers) for cooking.

To adapt the grille for use of the present invention, the conventional food-support grille is removed from the firebox, and replaced by a cooking pot support mechanism 21. Support mechanism 21 comprises two straight angle irons (bars) 23 positionable on peripheral rim 17. These two angle irons are interconnected by a plural number of U-shaped steel rods 25. FIG. 1 shows nine rods 25, but a lesser number of rods can be used. Each rod extends in a vertical plane transverse to the horizontal angle irons 23. The horizontal web portions 27 of the U-shaped rods form a platform 26 for supporting a conventional cast iron cooking pot 29. The vertical leg portions 31 of the U-shaped rods form vertical struts for suspending the platform below the level of angle irons 23. The U-shaped rods can have circular cross sections or rectangular cross sections Upper end portions of the rods are welded to angle irons 23.

The two angle irons 23 form ledges for supporting mechanism 21 on rim 17 of the grille firebox, with platform 26 located relatively close to bottom wall 13 of the firebox. Typically cooking pot 29 will be an open topped cylindrical pot having a diameter of about eleven inches and a height of about seven or eight inches. When the pot is positioned on platform 26 the bottom external surface of the pot is spaced approximately two and one half inches from bottom wall 13 of the firebox, i.e. relatively close to the charcoal heat source.

Heat generated by the charcoal flows upwardly around pot 29 to heat the pot side wall. The pot has a relatively large diameter so that the pot side wall is fairly close to the firebox side wall 15 (FIG. 1). Normally the spacing 33 between the box side wall and pot side wall is only about two or three inches. The firebox side wall confines the heat to a certain extent, so that some heat is directed into the cooking pot through its side walls, rather than being dissipated out of the pot through the pot side wall.

FIG. 1 shows the cooking pot positioned in the left hand portion of the grille firebox, leaving the right hand portion of the firebox vacant. A flat food-support grille 35 can be positioned on the firebox rim for cooking additional food items. FIG. 1 illustrates one particular arrangement, wherein the cooking pot occupies a significant percentage of the firebox volume (or plan area). With large size fireboxes it would be possible to position two cooking pots in the firebox (side by side as viewed in FIG. 1). Each cooking pot would be supported on its own support mechanism 21.

During a prolonged cooking operation it may be necessary to add new charcoal into the firebox. This would require the temporary removal of each support mechanism 21 from the firebox. Two U-shaped handles 37 are welded or otherwise attached to angle irons 23. The handles are preferably located equidistant from the ends of the angle irons on an imaginary diammetrical line passing through the central vertical axis 39 of platform 26. The aim is to provide a balanced lifter action.

FIG. 3 illustrates a cooking pot support mechanism 40 of the invention usable on a circular barbecue grille 42. The grille comprises a firebox having a circular bottom wall 41 and a cylindrical upstanding side wall 43 that terminates in a rim 45. Mechanism 40 comprises an annular circular apertured plate 47 having a series of small apertures 49 and a large central circular opening 51. A series of L-shaped rods 53 extend downwardly from plate 47 in radial disposition relative to the axis 55 of opening 51. Each rod has a vertical leg portion 57 connected to plate 47, and a horizontal portion 59 extending radially to axis 55 of opening 51. The inner ends 60 of rod portions 59 are welded together to form a platform 26a for supporting the covered cooking pot 29. Vertical rod portions 57 constitutes suspension struts for platform 26a. Plate 47 constitutes a ledge means engageable with rim 45 to support mechanism 40 on the firebox. Two lifter handles 37a are welded or otherwise attached to plate 47 at diammetrically spaced points near the plate outer edge.

The operation of the FIG. 3 apparatus is similar to that of the apparatus shown in FIGS. 1 and 2. The upper surface of plate 47 can be used as a cooking surface. The plate acts as a heat-trapping device to maintain a relatively high temperature in the confined space surrounding pot 29. A substantial portion of the pot side wall height acts as a heating surface for the pot.

What is claimed is:

1. A cooking pot support mechanism for use on an upwardly open firebox, wherein the firebox includes a bottom wall and side walls extending upwardly therefrom to form a horizontal peripheral rim: said support mechanism comprising a horizontal ledge means positionable on the peripheral rim of the firebox; a horizontal platform spaced below the ledge means for disposition within the firebox; and a plurality of generally vertical suspension struts extending downwardly from the ledge means to the platform; said struts being rigidly connected to the ledge means and to the platform whereby the platform is located in near proximity to the bottom wall of the firebox when the ledge means is disposed on the peripheral rim of the firebox; said platform having sufficient area to support a covered cooking pot thereon; said ledge means comprising two horizontally spaced angle irons; said struts and said platform being formed by a plurality of parallel U-shaped rods, each rod comprising a horizontal web portion and two generally vertical leg portions extending upwardly from said web portion to respective ones of the spaced angle irons; the web portions of the U-shaped rods constituting the aforementioned platform; the leg portions of the U-shaped rods constituting the aforementioned struts.

2. A cooking pot support mechanism for use on an upwardly open firebox, wherein the firebox includes a bottom wall and side walls extending upwardly therefrom to form a horizontal peripheral rim: said support mechanism comprising a horizontal ledge means positionable on the peripheral rim of the firebox; a horizontal platform spaced below the ledge means for disposition within the firebox; and a plurality of generally vertical suspension struts extending downwardly from the ledge means to the platform; said struts being rigidly connected to the ledge means and to the platform whereby the platform is located in near proximity to the bottom wall of the firebox when said ledge means is disposed on the peripheral rim of the firebox; said platform having sufficient area to support a covered cooking pot thereon; said ledge means comprising an apertured plate having a central circular opening therein; said struts and said platform being formed by a plurality of bent rods; each rod comprising a horizontal rod portion and a generally vertical rod portion; the horizontal rod portions being connected together to define the aforementioned platform; the vertical rod portions being attached to said apertured plate at the peripheral edge of the central circular opening; said vertical rod portions constituting the aforementioned suspension struts; said circular opening being large enough to enable a covered cooking pot to extend therethrough.

* * * * *